(12) United States Patent
Chen et al.

(10) Patent No.: US 12,451,807 B2
(45) Date of Patent: Oct. 21, 2025

(54) DC-TO-DC CONVERTER CONTROL METHOD AND SYSTEM BASED ON BACKSTEPPING SUPER-TWISTING

(71) Applicant: Foshan Xianhu Laboratory, Guangdong (CN)

(72) Inventors: Jing Chen, Guangdong (CN); Chun Xiao, Guangdong (CN); Chihua Lu, Guangdong (CN); Mu Yang, Guangdong (CN); Siyilang You, Guangdong (CN); Jiawei Gao, Guangdong (CN); Huchuan Yang, Guangdong (CN); Junjie Zhao, Guangdong (CN); Congding Yang, Guangdong (CN); Zhuo Wang, Guangdong (CN)

(73) Assignee: FOSHAN XIANHU LABORATORY, Guangdong (CN)

( * ) Notice: Subject to any disclaimer, the term of this patent is extended or adjusted under 35 U.S.C. 154(b) by 196 days.

(21) Appl. No.: 18/509,927

(22) Filed: Nov. 15, 2023

(65) Prior Publication Data

US 2024/0429820 A1    Dec. 26, 2024

(30) Foreign Application Priority Data

Jun. 14, 2023   (CN) .......................... 202310702079.1

(51) Int. Cl.
*H02M 3/155*    (2006.01)
*H02M 1/00*     (2006.01)
*H02M 3/158*    (2006.01)

(52) U.S. Cl.
CPC ......... *H02M 3/158* (2013.01); *H02M 1/0012* (2021.05)

(58) Field of Classification Search
CPC .... H02M 3/155; H02M 3/158; H02M 1/0012; H02M 1/0003
See application file for complete search history.

(56) References Cited

U.S. PATENT DOCUMENTS

2021/0391791 A1*  12/2021  Kaneko ............... H02M 1/0064
2025/0030241 A1*   1/2025  Gao ....................... H02M 1/126

FOREIGN PATENT DOCUMENTS

| CN | 105141164 | 12/2015 |
| CN | 105978373 | 9/2016 |

(Continued)

OTHER PUBLICATIONS

Jianhua Zhang et al., Study of Super-Twisting sliding mode control for U model based nonlinear system, Journal of Hebei University of Science and Technology, vol. 37, No. 4, Jul. 12, 2016.

(Continued)

*Primary Examiner* — Adolf D Berhane
(74) *Attorney, Agent, or Firm* — Gottlieb, Rackman & Reisman, PC

(57) ABSTRACT

A DC-to-DC converter control method and system based on backstepping super-twisting, a device, and a storage medium are disclosed, the method including: constructing a state-space model of a DC-to-DC converter according to Kirchhoff's laws and a topological structure of the DC-to-DC converter; acquiring initial PWM wave control information by using a backstepping control algorithm in an inner current loop of the DC-to-DC converter according to the state-space model; processing the initial PWM wave control information by using a super-twisting sliding mode control algorithm in an outer voltage loop of the DC-to-DC converter based on the state-space model to obtain final PWM (Continued)

wave control information; and regulating an operation state of the DC-to-DC converter with the final PWM wave control information.

7 Claims, 2 Drawing Sheets

(56) References Cited

FOREIGN PATENT DOCUMENTS

| CN | 106230257 | 12/2016 |
|---|---|---|
| CN | 109378881 | 2/2019 |
| CN | 113054842 | 6/2021 |
| CN | 113625562 | 11/2021 |
| CN | 114167734 | 3/2022 |
| CN | 114498644 A | 5/2022 |
| CN | 114499187 | 5/2022 |
| CN | 114865910 | 8/2022 |
| CN | 114865916 | 8/2022 |

OTHER PUBLICATIONS

Yanxia Shen, Backstepping Sliding Mode Control for Buck Converter in DCM, Journal of Nanjing University of Science and Technology (Natural Science), vol. 32, No. 6, Dec. 30, 2008.

Xiaoyang Song et al., Sliding mode and backstepping control based on asynchronous motor four-quadrant operation system, Journal of Qingdao University (E& T), vol. 32, No. 2, pp. 12-16, May 31, 2017.

Search Report for Application No. 2023107020791, China Patent Office, Jul. 18, 2023.

* cited by examiner

DC-TO-DC CONVERTER CONTROL METHOD AND SYSTEM BASED ON BACKSTEPPING SUPER-TWISTING

CROSS-REFERENCE TO RELATED APPLICATION

This application is based on and claims the benefit of priority from Chinese Patent Application No. 2023107020791, filed on 14 Jun. 2023, the entirety of which is incorporated by reference herein.

TECHNICAL FIELD

The present disclosure relates to the technical field of applications of DC-to-DC converters, and in particular to a DC-to-DC converter control method and system based on backstepping super-twisting, a device, and a storage medium.

BACKGROUND

In practical applications, the performance of a DC-to-DC converter is determined by its topology and control algorithm. The topology serves as the foundation, while the control algorithm acts as the safeguard. Currently, scholars have proposed the use of a dual-loop controller based on proportional-integral algorithm to regulate the operation state of DC-to-DC converters. However, the implementation results have not been satisfactory, with issues such as poor robustness and significant system ripple.

SUMMARY

The present disclosure provides a DC-to-DC converter control method and system based on backstepping super-twisting, a device, and a storage medium, in order to solve one or more technical problems existing in the prior art by providing at least a beneficial alternative or condition.

In a first aspect, there is provided a DC-to-DC converter control method based on backstepping super-twisting, including:
constructing a state-space model of a DC-to-DC converter according to Kirchhoff's laws and a topological structure of the DC-to-DC converter;
acquiring initial PWM wave control information by using a backstepping control algorithm in an inner current loop of the DC-to-DC converter according to the state-space model;
processing the initial PWM wave control information by using a super-twisting sliding mode control algorithm in an outer voltage loop of the DC-to-DC converter based on the state-space model to obtain final PWM wave control information; and
regulating an operation state of the DC-to-DC converter with the final PWM wave control information.

Further, the topological structure of the DC-to-DC converter is a four-phase interleaved boost converter structure, which consists of four boost converter branches connected in parallel.

Further, the state-space model includes a state-space expression of a boost converter branch current and a state-space expression of a DC-to-DC converter output voltage.

Further, the acquiring initial PWM wave control information by using a backstepping control algorithm in an inner current loop of the DC-to-DC converter according to the state-space model includes:

determining a current error between the boost converter branch current and a set reference current, and then determining a rate of change of the current error according to the current error and the state-space expression of the boost converter branch current;
constructing a first constraint relationship between the current error and the rate of change of the current error using a Lyapunov function, and then determining an ideal control law according to the rate of change of the current error and the first constraint relationship;
determining a control law error between a virtual control law and the ideal control law, and then determining a rate of change of the control law error according to the ideal control law, the control law error and the state-space expression of the DC-to-DC converter output voltage; and
constructing a second constraint relationship between the control law error and the rate of change of the control law error using a Lyapunov function, and then determining the initial PWM wave control information according to the rate of change of the control law error and the second constraint relationship.

Further, the processing the initial PWM wave control information by using a super-twisting sliding mode control algorithm in an outer voltage loop of the DC-to-DC converter based on the state-space model to obtain final PWM wave control information includes:
converting the state-space expression of the DC-to-DC converter output voltage into a state-space expression with a direct-current (DC) component and an alternating current (AC) component under a condition that the rate of change of the current error is zero;
performing Laplace transform on each AC component in the converted state-space expression of the DC-to-DC converter output voltage to obtain a closed-loop transfer function of the inner current loop of the DC-to-DC converter, and then determining a rate of change of output voltage according to the closed-loop transfer function;
setting a sliding surface according to the DC-to-DC converter output voltage and a set reference voltage, and then determining a sliding mode control law according to the sliding surface; and
adjusting the initial PWM wave control information according to the sliding mode control law, the rate of change of output voltage and the state-space expression of the DC-to-DC converter output voltage to obtain the final PWM wave control information.

Further, the converting the state-space expression of the DC-to-DC converter output voltage into a state-space expression with a direct-current (DC) component and an alternating current (AC) component under a condition that the rate of change of the current error is zero includes:
determining an equivalent PWM wave control signal with the rate of change of the current error being zero;
preliminarily updating the state-space expression of the DC-to-DC converter output voltage using the equivalent PWM wave control signal;
respectively converting the boost converter branch current, a DC-to-DC converter input voltage, and the DC-to-DC converter output voltage into a form of a combination of a DC component and an AC component; and
converting the preliminarily updated state-space expression of the DC-to-DC converter output voltage into a state-space expression with a DC component and an AC component.

In a second aspect, there is provided a DC-to-DC converter control system based on backstepping super-twisting, including:

a construction module, which is configured for constructing a state-space model of a DC-to-DC converter according to Kirchhoff's laws and a topological structure of the DC-to-DC converter;

an acquisition module, which is configured for acquiring initial PWM wave control information by using a backstepping control algorithm in an inner current loop of the DC-to-DC converter according to the state-space model;

a processing module, which is configured for processing the initial PWM wave control information by using a super-twisting sliding mode control algorithm in an outer voltage loop of the DC-to-DC converter based on the state-space model to obtain final PWM wave control information; and a regulation module, which is configured for regulating an operation state of the DC-to-DC converter with the final PWM wave control information.

Further, the topological structure of the DC-to-DC converter is a four-phase interleaved boost converter structure, which consists of four boost converter branches connected in parallel.

In a third aspect, there is provided a computer device, including a memory and a processor, the memory storing a computer program which, when executed by the processor, causes the processor to perform the DC-to-DC converter control method based on backstepping super-twisting of the first aspect.

In a fourth aspect, there is provided a computer-readable storage medium storing a computer program which, when executed by a processor, causes the processor to perform the DC-to-DC converter control method based on backstepping super-twisting of the first aspect.

The present disclosure provides at least the following beneficial effects. By employing the backstepping control algorithm in the inner current loop of the DC-to-DC converter, the stability of the control system of the DC-to-DC converter can be improved. Meanwhile, by employing the super-twisting sliding mode control algorithm in the outer voltage loop of DC-to-DC converter, the output voltage ripple and output current ripple of DC-to-DC converter can be reduced, and better robustness is provided.

BRIEF DESCRIPTION OF DRAWINGS

The accompanying drawings are used to facilitate further understanding of the technical schemes of the present disclosure and constitute a part of the description to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail with reference to the accompanying drawings and embodiments. It should be understood that the specific embodiments described here are only intended to explain the present disclosure and are not intended to limit the present disclosure.

It is to be noted that although a division of functional modules is shown in a schematic diagram of a system and a logical order is shown in a flowchart, the steps shown or described may be executed, in some cases, in a different module division from that of the system or in a different order from that in the flowchart. The terms "first", "second", "third", "fourth", etc. in the specification and the above-mentioned drawings of the present disclosure are intended to distinguish similar objects and are not necessarily to describe a specific order or sequence. It should be understood that the ordinal numerals used in such a way can be interchanged where appropriate so that the embodiments of the present disclosure described herein can be implemented in an order other than those illustrated or described herein. Further, the terms "include" and "have" and any variations thereof are intended to encompass non-exclusive inclusion. For example, a process, method, system, product, or device that includes a series of steps or components is not limited to those steps or components explicitly listed, but may include additional steps or components that are inherent to such processes, methods, products, or devices, even if not explicitly stated.

Figure 1:
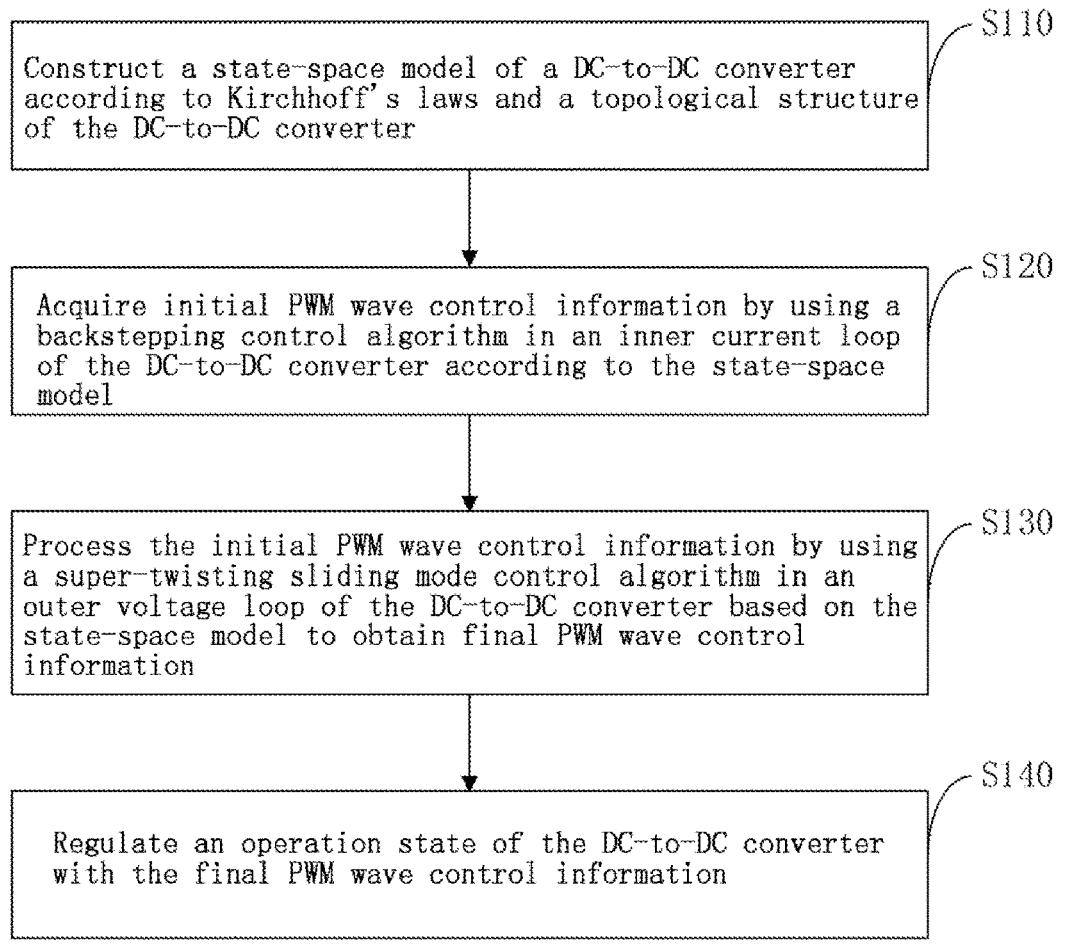
FIG. 1 is a flowchart of a DC-to-DC converter control method based on backstepping super-twisting in an embodiment of the present disclosure.

Referring to FIG. 1, FIG. 1 is a flowchart of a DC-to-DC converter control method based on backstepping super-twisting according to an embodiment of the present disclosure. The method can be applied to a control system of a DC-to-DC converter in a hydrogen fuel cell system. The method includes the following steps:

S110, constructing a state-space model of a DC-to-DC converter according to Kirchhoff's laws and a topological structure of the DC-to-DC converter;

S120, acquiring initial PWM wave control information by using a backstepping control algorithm in an inner current loop of the DC-to-DC converter according to the state-space model;

S130, processing the initial PWM wave control information by using a super-twisting sliding mode control algorithm in an outer voltage loop of the DC-to-DC converter based on the state-space model to obtain final PWM wave control information; and S140, regulating an operation state of the DC-to-DC converter with the final PWM wave control information.

Figure 2:
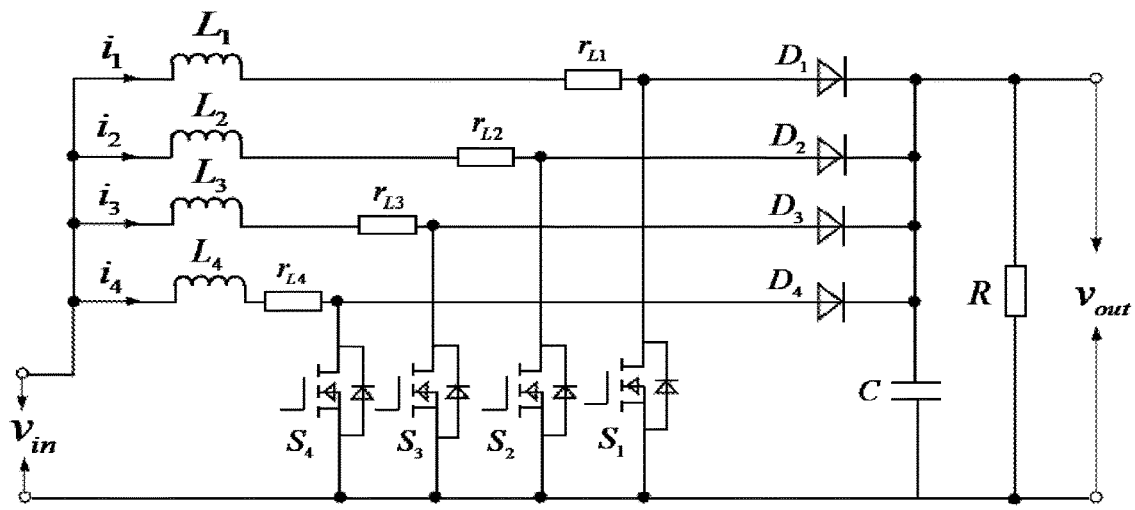
FIG. 2 is a schematic diagram of a topological structure of a four-phase interleaved boost converter in an embodiment of the present disclosure.

In the above-mentioned step S110, the topological structure of the DC-to-DC converter adopts a four-phase interleaved boost converter structure which, with reference to FIG. 2, consists of four boost converter branches connected in parallel, in which a first boost converter branch is composed of an inductor $L_1$, a parasitic resistance $r_{L1}$, an IGBT power transistor $S_1$, and a freewheeling diode $D_1$; a second boost converter branch is composed of an inductor $L_2$, a parasitic resistance $r_{L2}$, an IGBT power transistor $S_2$, and a freewheeling diode $D_2$; a third boost converter branch is composed of an inductor $L_3$, a parasitic resistance $r_{L3}$, an IGBT power transistor $S_3$, and a freewheeling diode $D_3$; and a fourth boost converter branch is composed of an inductor $L_4$, a parasitic resistance $r_{L4}$, an IGBT power transistor $S_4$, and a freewheeling diode $D_4$.

In an embodiment of the present disclosure, the specific implementation process of the above step S110 includes the following sub-steps.

At S111, based on a topological structure of the DC-to-DC converter and Kirchhoff's laws, a state-space model of a DC-to-DC converter is constructed as follows:

$$\begin{cases} \dfrac{di_k}{dt} = -(1-u_k)\dfrac{v_{out}}{L_k} - \dfrac{r_{Lk}}{L_k}i_k + \dfrac{r_{Lk}}{L_k}v_{in}; \\ \dfrac{dv_{out}}{dt} = \dfrac{1}{C}\sum_{k=1}^{4}i_k - \dfrac{1}{RC}v_{out} - \dfrac{1}{C}\sum_{k=1}^{4}u_k i_k; \end{cases} \quad (1)$$

where $i_k$ is the branch current flowing through the k-th boost converter branch, t is the time, $u_k$ is the PWM wave control signal required by the k-th boost converter branch, $V_{out}$ is the output voltage (or DC bus voltage) of the DC-to-DC converter, $L_k$ is the inductance on the k-th boost converter branch, $r_{Lk}$ is the parasitic resistance on the k-th boost converter branch, $v_{in}$ is the input voltage of the DC-to-DC converter, C is the common capacitance, R is the load resistance, and k=1, 2, 3, 4. Herein, PWM refers to pulse width modulation.

At S112, as the four boost converter branches are equipped with identical models and parameters for both the inductors (i.e. $L_1=L_2=L_3=L_4$) and the parasitic resistors (i.e. $r_{L1}=r_{L2}=r_{L3}=r_{L4}$) in practical applications of the DC-to-DC converter, for the convenience of description, let $L=L_k$, and $r_L=r_{Lk}$, and it is defined that $x_{1k}=i_k$, and $x_2=v_{out}$, and at the same time, the currents of the four boost converter branches are equal (i.e. $i_1=i_2=i_3=i_4$), which is referred to as "boost converter branch current" for short, and the initial state-space model is rearranged (i.e., the above equation (1) is rearranged) to obtain the state-space expression of the boost converter branch current as follows:

$$\dot{x}_{1k} = -(1-u_k)\dfrac{x_2}{L} - \dfrac{r_L}{L}x_{1k} + \dfrac{r_L}{L}v_{in}; \quad (2)$$

and the state-space expression of the DC-to-DC converter output voltage as follows:

$$\dot{x}_2 = \dfrac{1}{C}\sum_{k=1}^{4}x_{1k} - \dfrac{1}{RC}x_2 - \dfrac{1}{C}\sum_{k=1}^{4}u_k x_{1k}; \quad (3)$$

and then, the state-space expression of the boost converter branch current and the state-space expression of the DC-to-DC converter output voltage are defined as the state-space model of the DC-to-DC converter.

In an embodiment of the present disclosure, the backstepping control algorithm is employed in the inner current loop of the DC-to-DC converter, such that the boost converter branch current $i_k$ is asymptotically stable at the set reference current $I_{ref}$, the output voltage $V_{out}$ is asymptotically stable at the set reference voltage $V_{ref}$, and the final PWM wave control signal $u_k$ is asymptotically stable at $U_k=1-v_{in}/v_{out}$.

The specific implementation process of the above step S120 includes the following sub-steps.

At S121, a current error between the boost converter branch current and a set reference current is determined as:

$$z_{1k} = x_{1k} - I_{ref}; \quad (4)$$

and the range of the current error is defined as:

$$z_{1k} \in [i_k^{min} - i_k^{max}, i_k^{max} - i_k^{min}];$$

based on the state-space expression of the boost converter branch current and the current error (i.e. by first differentiating the above equation (4) and substituting the above equation (2)), the rate of change of the current error is determined as:

$$\dot{z}_{1k} = -(1-u_k)\dfrac{x_2}{L} - \dfrac{r_L}{L}x_{1k} + \dfrac{r_L}{L}v_{in} - \dot{I}_{ref}; \quad (5)$$

where $Z_{1k}$ is the current error, $i_k^{min}$ is the minimum value of the boost converter branch current, $i_k^{max}$ is the maximum value of the boost converter branch current, $\dot{z}_{1k}$ is the rate of change of the current error, and $\dot{I}_{ref}$ is the first derivative of the set reference current $I_{ref}$.

At S122, the Lyapunov function $V_1(z_{1k})$ for the current error is constructed as:

$$V_1(z_{1k}) = \dfrac{1}{2}\sum_{k=1}^{4}z_{1k}^2; \quad (6)$$

in order to make the Lyapunov function (that is, the above equation (6)) hold, it is necessary to satisfy the condition that when $z_{1k} \neq 0$, $V_1(0)=0$ and $V_1(z_{1k})>0$;

however, when $z_{1k} \neq 0$ and $\dot{V}_1(z_{1k})<0$, the first constraint relationship between the rate of change of the current error and the current error is defined as:

$$\dot{z}_{1k} = -c_1 z_{1k}; \quad (7)$$

and then, based on the rate of change of the current error (i.e. the above equation (5)) and the first constraint relationship (i.e. the above equation (7)), the ideal control law is determined as:

$$\alpha_k = \left[c_1 z_{1k} - \dfrac{r_L}{L}x_{1k} + \dfrac{r_L}{L}v_{in} - \dot{I}_{ref}\right]/(1-u_k); \quad (8)$$

and the range of the ideal control law is defined as:

$$\alpha_k \in [x_2^{min}/L, x_2^{max}/L];$$

where $c_1$ is a preset control constant greater than zero, $\alpha_k$ is the ideal control law, $x_2^{min}$ is the minimum value of the DC-to-DC converter output voltage, and $x_2^{max}$ is the maximum value of the DC-to-DC converter output voltage.

At S123, the virtual control law is set as $K=x_2/L$, and to ensure that K asymptotically approaches $\alpha_k$ as $t \to \infty$, the control law error between the virtual control law and the ideal control law is determined as:

$$z_{2k} = \frac{x_2}{L} - \alpha_k; \qquad (9)$$

and the range of the control law error is defined as:

$$z_{2k} \in \left[(x_2^{min} - x_2^{max})/L, (x_2^{max} - x_2^{min})/L\right];$$

based on the control law error, the ideal control law and the state-space expression of the DC-to-DC converter output voltage (i.e. by first differentiating the above equation (8) to obtain a first result, then differentiating the above equation (9), and substituting the first result and the above equation (3)), the rate of change of the control law error is determined as:

$$\dot{z}_{2k} = \frac{1}{LC}\sum_{k=1}^{4}(x_{1k}) - \frac{1}{LC}\sum_{k=1}^{4}(u_k x_{1k}) - \qquad (10)$$

$$\frac{x_2}{RLC} + \frac{c_1^2 z_{1k}}{1-u_k} + \frac{\dot{I}_{ref}}{1-u_k} + \frac{r_L \dot{x}_{1k}}{L(1-u_k)} - \frac{\dot{u}_k \alpha_k}{1-u_k};$$

where the first result is:

$$\dot{\alpha}_k = \frac{c_1 z_{1k} - \dot{I}_{ref}}{1 - u_k} - \frac{r_L \dot{x}_{1k}}{L(1-u_k)} + \frac{\dot{u}_k \alpha_k}{1-u_k}; \qquad (11)$$

where $z_{2k}$ is the control law error, $\dot{z}_{2k}$ is the rate of change of the control law error, and $\ddot{I}_{ref}$ is the second derivative of the set reference current $I_{ref}$, $\dot{x}_{1k}$ is the rate of change of the boost converter branch current, and $\dot{u}_k$ is the initial PWM wave control information.

At S124, the Lyapunov function $V_1(z_{2k})$ for the control law error is constructed as:

$$V_1(z_{2k}) = \frac{1}{2}\sum_{k=1}^{4} z_{2k}^2; \qquad (12)$$

in order to make the Lyapunov function (that is, the above equation (12)) hold, it is necessary to satisfy the condition that when $z_{2k} \neq 0$, $V_1(0)=0$ and $V_1(z_{2k})>0$; however, when $z_{2k} \neq 0$ and $_1(z_{2k})<0$, the second constraint relationship between the rate of change of the control law error and the control law error is defined as:

$$c_2 z_{2k} + \dot{z}_{2k} = 0; \qquad (13)$$

and then, based on the rate of change of the control law error (i.e. the above equation (10)) and the second constraint relationship (i.e. the above equation (13)), the initial PWM wave control information is determined as:

$$\dot{u}_k = \left\{ [c_1^2 - (1-u_k)^2] z_{1k} + [(c_1+c_2)(1-u_k)] z_{2k} + \right. \qquad (14)$$

$$\left. \frac{1-u_k}{LC}\sum_{k=1}^{4}[(1-u_k)x_{1k}] - \frac{1-u_k}{RLC}x_2 + \ddot{I}_{ref} + \frac{r_L \dot{x}_{1k}}{L} \right\}/\alpha_k;$$

where $c_2$ is a preset control constant greater than zero.

In an embodiment of the present disclosure, assuming that the DC-to-DC converter is in a stable state, where $z_{1k}=0$ and $z_{2k}=0$, and for convenience of calculation, neglecting $r_L$ with a relatively small value, we can obtain:

$$x_{1k} = I_{ref}, x_2 = V_{ref}, \dot{I}_{ref} = 0, \alpha_k = V_{in}/[L(1-u_k)]; \qquad (15)$$

and then, the initial PWM wave control information (i.e. the above equation (14)) is rearranged by using the values of the related parameters provided by the above equation (15), and the initial PWM wave control information is obtained as follows:

$$\dot{u}_k = \left[\frac{4(1-u_k)^2}{C}I_{ref} - \frac{1-u_k}{RC}V_{ref}\right] \times \frac{1-u_k}{V_{in}}; \qquad (16)$$

in the above equation (16), let $\dot{u}_k=0$, and the equilibrium point is obtained as follows:

$$X_{1k} = \frac{X_2^2}{4Rv_{in}}; \qquad (17)$$

where $V_{in}$ is the average input voltage of the DC-to-DC converter in a stable state, which is obtained by detecting the instantaneous values of the input voltage $v_{in}$ within a preset period of time and then calculating the average, and can be used as the DC component of the input voltage $v_{in}$; $X_{1k}$ is the average current of the boost converter branch in a stable state of the DC-to-DC converter, and can be used as the DC component of the boost converter branch current $x_{1k}$; and $X_2$ is the average output voltage of the DC-to-DC converter in a stable state, which is obtained by detecting the instantaneous values of the output voltage $x_2$ within a preset period of time and then calculating the average, and can be used as the DC component of the DC-to-DC converter output voltage $x_2$.

In an embodiment of the present disclosure, the specific implementation process of the above step S130 includes the following sub-steps.

At S131, the state-space expression of the DC-to-DC converter output voltage is converted into a state-space expression with a DC component and an AC component under the condition that the rate of change of the current error is zero, which is specifically represented as the following steps:

firstly, in the above equation (5), let $\dot{z}_{1k}=0$, such that the equivalent PWM wave control signal is determined as:

$$u_k = u_{eq} = 1 + \frac{\dot{I}_{ref}L - v_{in}}{x_2}; \qquad (18)$$

secondly, the equivalent PWM wave control signal (i.e. the above equation (18)) is substituted into the state-space expression of the DC-to-DC converter output voltage (i.e. the above equation (3)) for preliminary updating to obtain:

$$x_2 \frac{dx_2}{dt} = \frac{4x_{1k}v_{in}}{C} - \frac{x_2^2}{RC} - \frac{4Lx_1}{C}\frac{dI_{ref}}{dt}; \quad (19)$$

next, the input voltage and the output voltage of the DC-to-DC converter and the boost converter branch current are respectively converted into a combined form of a DC component and an AC component, which is specifically represented as:

$$x_{1k} = X_{1k} + \tilde{x}_{1k}, \, x_2 = X_2 + \tilde{x}_2, \, v_{in} = V_{in} + \tilde{v}_{in}; \quad (20)$$

and finally, the state-space expression of the DC-to-DC converter output voltage after the preliminary updating is converted (i.e. the above equation (19) is rearranged based on the equations provided by the above equation (17) and the above equation (20)) to obtain the state-space expression with a DC component and an AC component as follows:

$$X_2 \frac{d\tilde{x}_2}{dt} = \frac{X_2^2 \tilde{v}_{in} + 4\tilde{x}_{1k}v_{in}^2 R}{RCv_{in}} - \frac{2X_2\tilde{x}_2}{RC} - \frac{LX_2^2}{RCV_{in}}\frac{d\tilde{x}_{1k}}{dt}; \quad (21)$$

where $\tilde{x}_{1k}$ is the AC component of the boost converter branch current $x_{1k}$, $\tilde{x}_2$ is the AC component of the DC-to-DC converter output voltage $x_2$, and $\tilde{v}_{in}$ is the AC component of the DC-to-DC converter input voltage $v_{in}$.

At S132, Laplace transform is performed on each AC component in the converted state-space expression of the DC-to-DC converter output voltage (i.e. the above equation (21)) to obtain a closed-loop transfer function of the inner current loop of the DC-to-DC converter as follows:

$$\begin{cases} G_{ie}|_{v_{in}(s)=0} = \frac{a-bs}{s+c}; \\ a = \frac{4V_{in}}{X_2 C}, \, b = \frac{LX_2}{RCV_{in}}, \, c = \frac{2}{RC} \end{cases} \quad (22)$$

where $G_{ie}$ is the closed-loop transfer function value, a, b, and c are all parameter placeholders, each with corresponding solution formulas, and S is a complex variable.

At S133, the closed-loop transfer function of the inner current loop of the DC-to-DC converter (i.e. the above equation (22)) is regarded as an equivalent device, and with the set reference current $I_{ref}$ as the input quantity and the output voltage $x_2$ as the output quantity, the rate of change of the output voltage is determined as:

$$\dot{x}_2 = -cx_2 + aI_{ref} - b\dot{I}_{ref}. \quad (23)$$

At S134, a sliding surface is set based on the DC-to-DC converter output voltage and a set reference voltage as:

$$s = x_2 - V_{ref}; \quad (24)$$

and then, a sliding mode control law is set according to the sliding surface as:

$$I_{ref} = -\beta_1 |s|^{1/2}\text{sgn}(s) - \int \beta_2 \text{sgn}(s)dt; \quad (25)$$

where $\beta_1$ and $\beta_2$ are two constants greater than 0, and sgn refers to the sign function.

At S135, the initial PWM wave control information is adjusted based on the rate of change of the output voltage, the sliding mode control law and the state-space expression of the DC-to-DC converter output voltage to obtain the final PWM wave control information, which is specifically represented as the following steps:

firstly, calculate the first derivative and second derivative of the equation (25) above, respectively, resulting in:

$$\begin{cases} \dot{I}_{ref} = -\frac{1}{2}\beta_1 |s|^{-1/2}\dot{x}_2 \text{sgn}(s) - \beta_2 \text{sgn}(s), \, \dot{x}_2 = \dot{s}; \\ \ddot{I}_{ref} = \left(\frac{1}{4}\beta_1 |s|^{-3/2}\dot{x}_2 - \frac{1}{2}\beta_1 |s|^{-1/2}\ddot{x}_2\right)\text{sgn}(s), \, \ddot{x}_2 = \ddot{s} \end{cases} \quad (26)$$

secondly, the above equation (3) is differentiated again to obtain the following equation:

$$\ddot{x}_2 = \frac{1}{C}\left[\sum_{k=1}^{4}[(1-u_k)\dot{x}_{1k}] - \frac{\dot{x}_2}{R} - \sum_{k=1}^{4}(\dot{u}_k x_{1k})\right]; \quad (27)$$

and finally, after the above equation (27) is substituted into the above equation (26), the rearranged equation (26) is substituted into the above equation (14), and for convenience of calculation, neglecting $r_L$ with a relatively small value, the final PWM wave control information is obtained as follows:

$$\begin{cases} \dot{u}_k = \frac{C}{C\alpha_k - 2\beta_1 |s|^{-1/2}\text{sgn}(s)x_{1k}} \times \Delta; \\ \Delta = \begin{cases} [c_1^2 - (1-u_k)^2]z_{1k} + [(c_1+c_2)(1-u_k)]z_{2k} + \\ \frac{4(1-u_k)^2 x_{1k}}{LC} - \frac{1-u_k}{RLC}x_2 + \frac{1}{4}\beta_1 |s|^{-3/2}\dot{x}_2^2 - \\ 2\beta_1 |s|^{-1/2}(1-u_k)x_{1k}\text{sgn}(s) + \frac{\beta_1 \dot{x}_2^2}{2RC}|s|^{-1/2} \end{cases} \end{cases} \quad (28)$$

where $\Delta$ is a parameter placeholder with a corresponding solution formula.

It should be noted that in the above step S140, the final PWM wave control information should be first subjected to integral processing to be converted into the final PWM wave control signal, before the IGBT power transistor associated with the DC-to-DC converter can be controlled by the final PWM wave control signal, so as to realize the regulation of the operation state of the DC-to-DC converter.

In the embodiments of the present disclosure, by employing the backstepping control algorithm in the inner current loop of the DC-to-DC converter, the stability of the control system of the DC-to-DC converter can be improved. Meanwhile, by employing the super-twisting sliding mode control algorithm in the outer voltage loop of DC-to-DC converter, the output voltage ripple and output current ripple of DC-to-DC converter can be reduced, and better robustness is provided.

Figure 3:
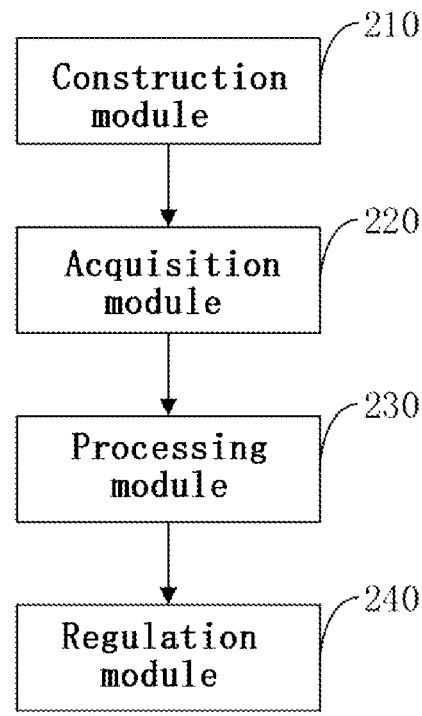
FIG. 3 is a schematic diagram of a DC-to-DC converter control system based on backstepping super-twisting in an embodiment of the present disclosure.

Referring to FIG. 3, FIG. 3 is a schematic diagram of a DC-to-DC converter control system based on backstepping super-twisting according to an embodiment of the present disclosure. The system includes:

- a construction module 210, which is configured for constructing a state-space model of a DC-to-DC converter according to Kirchhoff's laws and a topological structure of the DC-to-DC converter;
- an acquisition module 220, which is configured for acquiring initial PWM wave control information by using a backstepping control algorithm in an inner current loop of the DC-to-DC converter according to the state-space model;
- a processing module 230, which is configured for processing the initial PWM wave control information by using a super-twisting sliding mode control algorithm in an outer voltage loop of the DC-to-DC converter based on the state-space model to obtain final PWM wave control information: and
- a regulation module 240, which is configured for regulating an operation state of the DC-to-DC converter with the final PWM wave control information.

In an embodiment of the present disclosure, the topological structure of the DC-to-DC converter adopts a four-phase interleaved boost converter structure which, with reference to FIG. 2, consists of four boost converter branches connected in parallel, in which a first boost converter branch is composed of an inductor $L_1$, a parasitic resistance $r_{L1}$, an IGBT power transistor $S_1$, and a freewheeling diode $D_1$; a second boost converter branch is composed of an inductor $L_2$, a parasitic resistance $r_{L2}$, an IGBT power transistor $S_2$, and a freewheeling diode $D_2$; a third boost converter branch is composed of an inductor $L_3$, a parasitic resistance $r_{L3}$, an IGBT power transistor $S_3$, and a freewheeling diode $D_3$; and a fourth boost converter branch is composed of an inductor $L_4$, a parasitic resistance $r_{L4}$, an IGBT power transistor $S_4$, and a freewheeling diode $D_4$.

The contents in the above method embodiments are all applicable to this system embodiment, the functions realized by this system embodiment are the same as those of the above method embodiments, and the beneficial effects achieved are also the same as those of the above method embodiments, so they are not repeated here.

Additionally, an embodiment of the present disclosure also provides a computer-readable storage medium storing a computer program which, when executed by a processor, causes the processor to perform the DC-to-DC converter control method based on backstepping super-twisting in the above embodiments. Specifically, the computer-readable storage medium includes, but is not limited to, any type of disk (including floppy disks, hard disks, optical disks, CD-ROMs, and magneto-optical disks), Read-Only Memory (ROM), Random Access Memory (RAM), Erasable Programmable Read-Only Memory (EPROM), Electrically Erasable Programmable Read-Only Memory (EEPROM), flash memory, magnetic cards or optical cards. That is, the storage device includes any medium in which information is stored or transmitted in a readable form by a device (e.g. a computer, a mobile phone or the like) and may be a read-only memory, a magnetic disk, an optical disk, etc.

Figure 4:
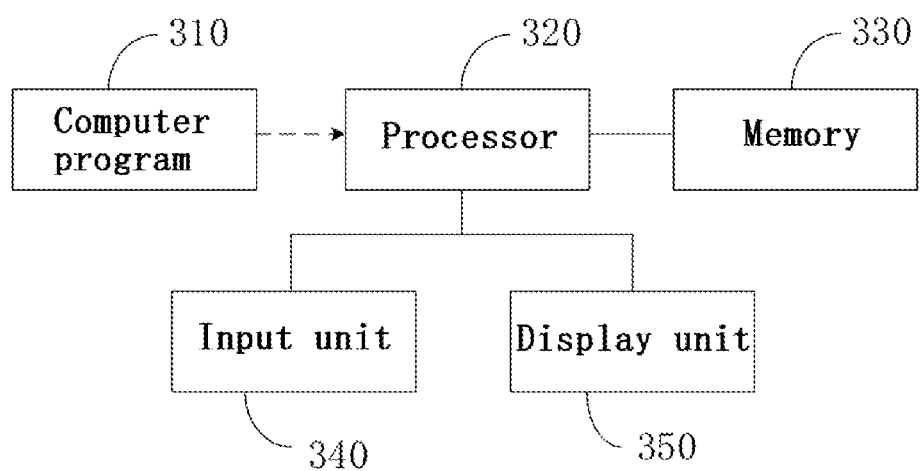
FIG. 4 is a schematic diagram of a hardware structure of a computer device in an embodiment of the present disclosure.

In addition, FIG. 4 is a schematic diagram of a hardware structure of a computer device according to an embodiment of the present disclosure. The computer device includes a processor 320, a memory 330, an input unit 340, a display unit 350, etc. Those skilled in the art will appreciate that the components of the device shown in FIG. 4 do not constitute a limitation to all alternative devices and may include more or fewer components than illustrated or may combine some of the components. The memory 330 may be used to store the computer program 310 and various functional modules. The processor 320 executes the computer program 310 stored in the memory 330, thereby executing various functional applications and data processing of the device. The memory may be an internal memory or an external memory, or include both. The internal memory may include a read-only memory (ROM), a programmable ROM (PROM), an electrically programmable ROM (EPROM), an electrically erasable programmable ROM (EEPROM), a flash memory, or random access memory. The external memory may include hard disks, floppy disks, ZIP disks, USB flash drives, magnetic tapes, etc. The memory 330 disclosed by the embodiments of the present disclosure includes but is not limited to these types of memory described above. The memory 330 disclosed by the embodiments of the present disclosure is provided as an example and not intended to be limiting.

The input unit 340 is configured to receive an input signal and receive key input by a user. The input unit 340 may include a touch panel and other input devices. The touch panel is capable of collecting user touch operations on or near its surface (such as when users use their fingers, stylus, or any other suitable object or accessory to interact with the touch panel or perform actions near the touch panel) and then driving the corresponding connected devices based on pre-set programs. Other input devices may include, but are not limited to, physical keyboards, function keys (such as play control keys, switch keys, etc.), trackballs, mice, joysticks, or a combination thereof. The display unit 350 may be configured to display information input by a user or information provided to the user and various menus of a terminal device. The display unit 350 may be in the form of a liquid crystal display, an organic light emitting diode display, etc. The processor 320 is a control center of the terminal device, connects various parts of the entire device using various interfaces and circuits, performs various functions and processes data by running or executing software programs and/or modules stored in the memory 330 and invoking data stored in the memory 330.

As an embodiment, the computer device includes a processor 320, a memory 330, and a computer program 310, where the computer program 310 is stored in the memory 330 and configured to be executed by the processor 320, and the computer program 310 is configured to execute the DC-to-DC converter control method based on backstepping super-twisting in the above embodiments.

While the description of the present disclosure has been sufficiently detailed and specifically describes several embodiments, it is not intended to be limited to any of these details, embodiments, or any particular embodiment. Rather, it should be understood as providing a broad and comprehensive disclosure of the present disclosure by reference to the appended claims, which, in view of the prior art, provide a range of possible interpretations that effectively encompass the intended scope of the present disclosure. Furthermore, the above description of the present disclosure is provided by the inventors in foreseeable embodiments to provide a useful disclosure. It should be understood that non-substantive modifications to the present disclosure, which are not yet foreseeable, but which can be considered equivalent modifications, are also encompassed by the present disclosure.

What is claimed is:

1. A DC-to-DC converter control method based on backstepping super-twisting, comprising:
constructing a state-space model of a DC-to-DC converter according to Kirchhoff's laws and a topological structure of the DC-to-DC converter, the state-space model comprising a state-space expression of a boost converter branch current and a state-space expression of a DC-to-DC converter output voltage;
acquiring initial PWM wave control information by using a backstepping control algorithm in an inner current loop of the DC-to-DC converter according to the state-space model;
processing the initial PWM wave control information by using a super-twisting sliding mode control algorithm in an outer voltage loop of the DC-to-DC converter based on the state-space model to obtain final PWM wave control information; and
regulating an operation state of the DC-to-DC converter with the final PWM wave control information;
wherein the acquiring initial PWM wave control information by using a backstepping control algorithm in an inner current loop of the DC-to-DC converter according to the state-space model comprises:
determining a current error between the boost converter branch current and a set reference current, and then determining a rate of change of the current error according to the current error and the state-space expression of the boost converter branch current;
constructing a first constraint relationship between the current error and the rate of change of the current error using a Lyapunov function, and then determining an ideal control law according to the rate of change of the current error and the first constraint relationship;
determining a control law error between a virtual control law and the ideal control law, and then determining a rate of change of the control law error according to the ideal control law, the control law error and the state-space expression of the DC-to-DC converter output voltage; and
constructing a second constraint relationship between the control law error and the rate of change of the control law error using a Lyapunov function, and then determining the initial PWM wave control information according to the rate of change of the control law error and the second constraint relationship;
wherein the processing the initial PWM wave control information by using a super-twisting sliding mode control algorithm in an outer voltage loop of the DC-to-DC converter based on the state-space model to obtain final PWM wave control information comprises:
converting the state-space expression of the DC-to-DC converter output voltage into a state-space expression with a direct-current (DC) component and an alternating current (AC) component under a condition that the rate of change of the current error is zero;
performing Laplace transform on each AC component in the converted state-space expression of the DC-to-DC converter output voltage to obtain a closed-loop transfer function of the inner current loop of the DC-to-DC converter, and then determining a rate of change of output voltage according to the closed-loop transfer function;
setting a sliding surface according to the DC-to-DC converter output voltage and a set reference voltage, and then determining a sliding mode control law according to the sliding surface; and
adjusting the initial PWM wave control information according to the sliding mode control law, the rate of change of output voltage and the state-space expression of the DC-to-DC converter output voltage to obtain the final PWM wave control information.

2. The DC-to-DC converter control method based on backstepping super-twisting of claim 1, wherein the topological structure of the DC-to-DC converter is a four-phase interleaved boost converter structure, which consists of four boost converter branches connected in parallel.

3. The DC-to-DC converter control method based on backstepping super-twisting of claim 1, wherein the converting the state-space expression of the DC-to-DC converter output voltage into a state-space expression with a DC component and an AC component under a condition that the rate of change of the current error is zero comprises:
determining an equivalent PWM wave control signal with the rate of change of the current error being zero;
preliminarily updating the state-space expression of the DC-to-DC converter output voltage using the equivalent PWM wave control signal;
respectively converting the boost converter branch current, a DC-to-DC converter input voltage, and the DC-to-DC converter output voltage into a form of a combination of a DC component and an AC component; and
converting the preliminarily updated state-space expression of the DC-to-DC converter output voltage into a state-space expression with a DC component and an AC component.

4. A DC-to-DC converter control system based on backstepping super-twisting, comprising:
a construction module, which is configured for constructing a state-space model of a DC-to-DC converter according to Kirchhoff's laws and a topological structure of the DC-to-DC converter, the state-space model comprising a state-space expression of a boost converter branch current and a state-space expression of a DC-to-DC converter output voltage;
an acquisition module, which is configured for acquiring initial PWM wave control information by using a backstepping control algorithm in an inner current loop of the DC-to-DC converter according to the state-space model;
a processing module, which is configured for processing the initial PWM wave control information by using a super-twisting sliding mode control algorithm in an outer voltage loop of the DC-to-DC converter based on the state-space model to obtain final PWM wave control information; and
a regulation module, which is configured for regulating an operation state of the DC-to-DC converter with the final PWM wave control information; wherein
in the acquisition module, the acquiring initial PWM wave control information by using a backstepping control algorithm in an inner current loop of the DC-to-DC converter according to the state-space model comprises:
determining a current error between the boost converter branch current and a set reference current, and then determining a rate of change of the current error according to the current error and the state-space expression of the boost converter branch current;

constructing a first constraint relationship between the current error and the rate of change of the current error using a Lyapunov function, and then determining an ideal control law according to the rate of change of the current error and the first constraint relationship;

determining a control law error between a virtual control law and the ideal control law, and then determining a rate of change of the control law error according to the ideal control law, the control law error and the state-space expression of the DC-to-DC converter output voltage; and constructing a second constraint relationship between the control law error and the rate of change of the control law error using a Lyapunov function, and then determining the initial PWM wave control information according to the rate of change of the control law error and the second constraint relationship;

in the processing module, the processing the initial PWM wave control information by using a super-twisting sliding mode control algorithm in an outer voltage loop of the DC-to-DC converter based on the state-space model to obtain final PWM wave control information comprises:

converting the state-space expression of the DC-to-DC converter output voltage into a state-space expression with a direct-current (DC) component and an alternating current (AC) component under a condition that the rate of change of the current error is zero;

performing Laplace transform on each AC component in the converted state-space expression of the DC-to-DC converter output voltage to obtain a closed-loop transfer function of the inner current loop of the DC-to-DC converter, and then determining a rate of change of output voltage according to the closed-loop transfer function;

setting a sliding surface according to the DC-to-DC converter output voltage and a set reference voltage, and then determining a sliding mode control law according to the sliding surface; and adjusting the initial PWM wave control information according to the sliding mode control law, the rate of change of output voltage and the state-space expression of the DC-to-DC converter output voltage to obtain the final PWM wave control information.

5. The DC-to-DC converter control system based on backstepping super-twisting of claim 4, wherein the topological structure of the DC-to-DC converter is a four-phase interleaved boost converter structure, which consists of four boost converter branches connected in parallel.

6. A computer device, comprising a memory and a processor, the memory storing a computer program which, when executed by the processor, causes the processor to perform the DC-to-DC converter control method based on backstepping super-twisting of claim 1.

7. A non-transitory computer-readable storage medium storing a computer program which, when executed by a processor, causes the processor to perform the DC-to-DC converter control method based on backstepping super-twisting of claim 1.

* * * * *